Fig. 22
Fig. 23
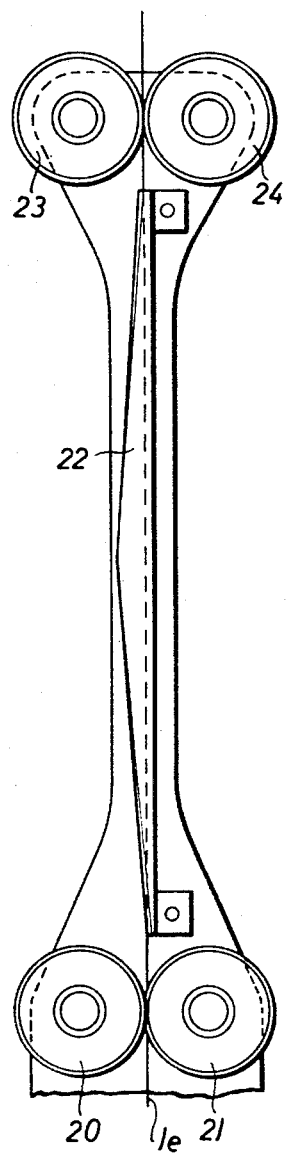
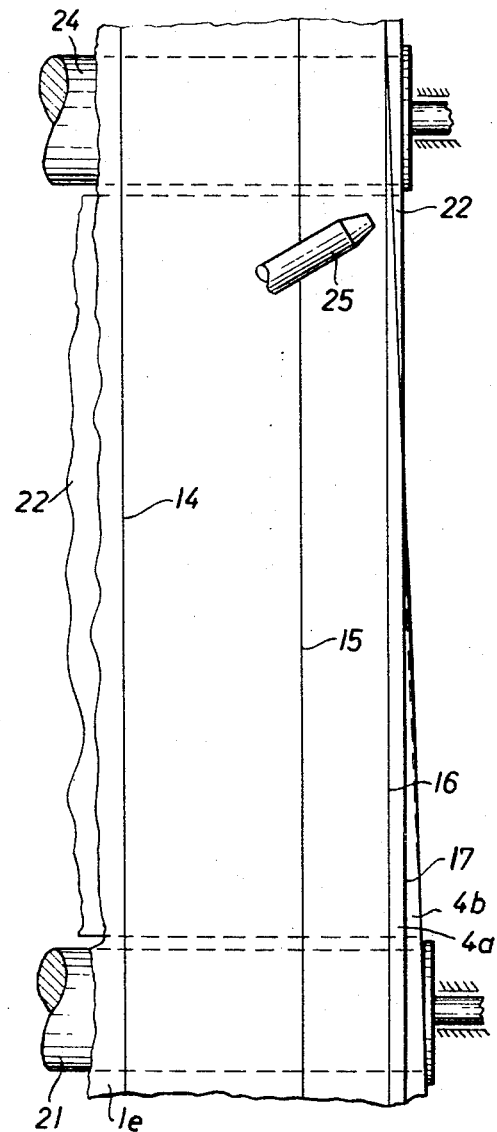
INVENTORS
GEORG THESING
ECKEHARD SINGE
BY
their ATTORNEY

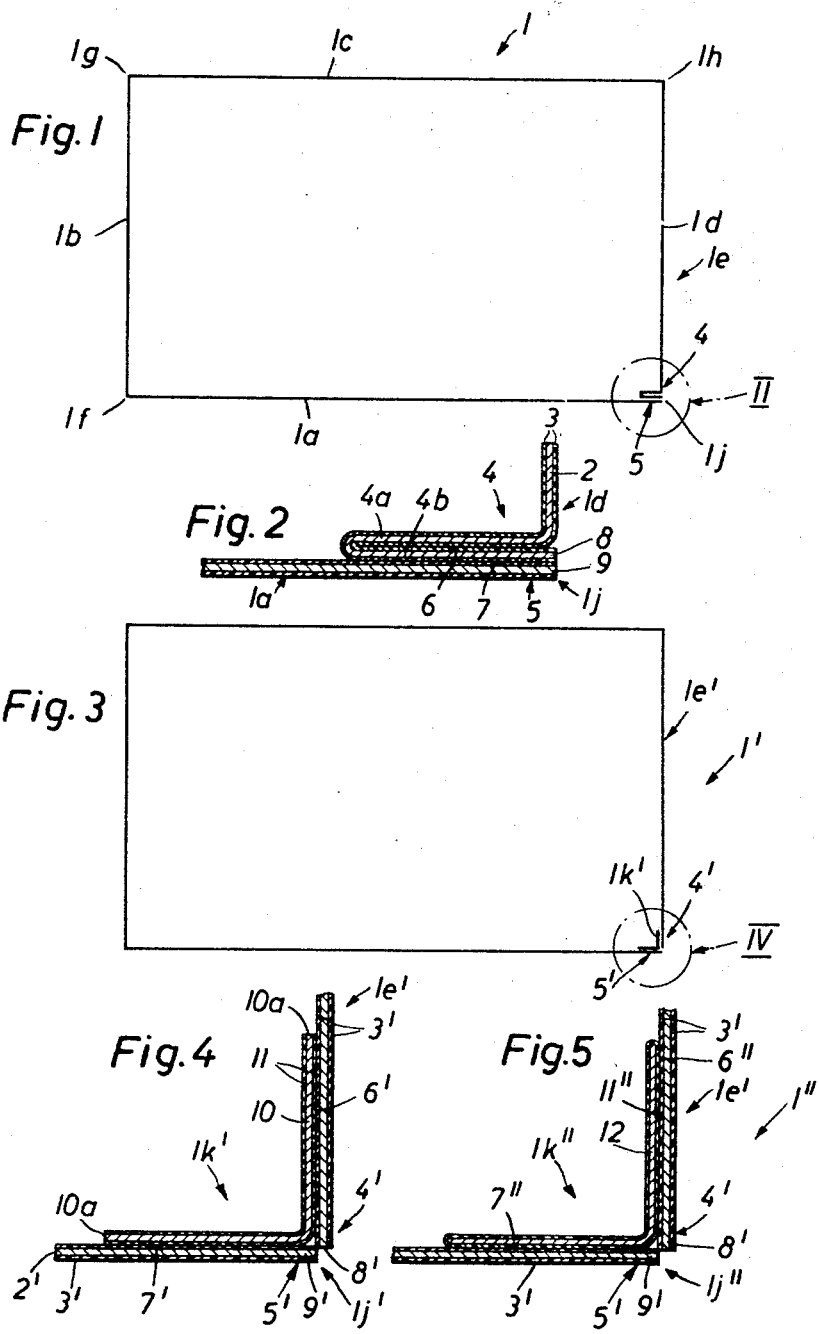

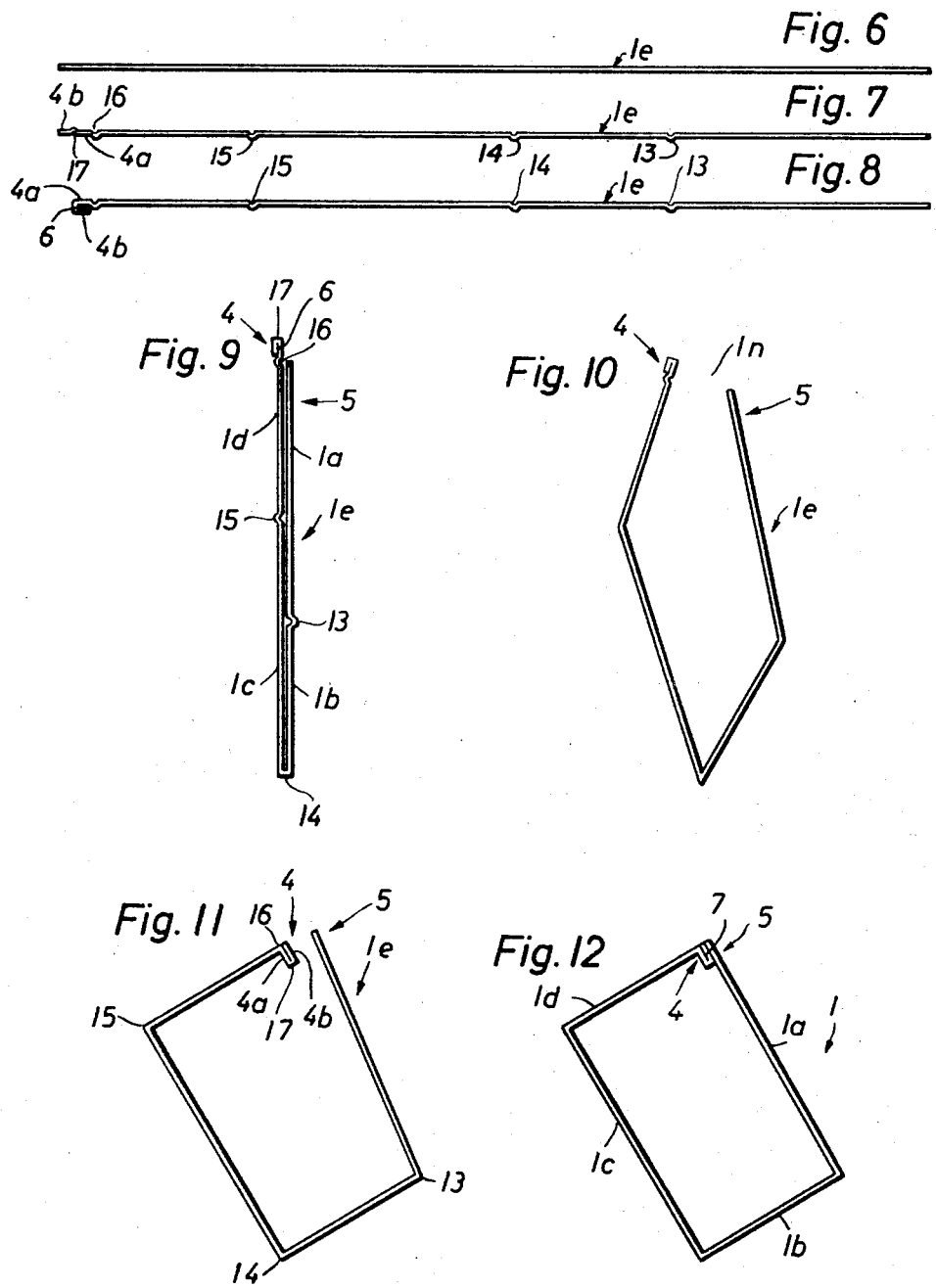

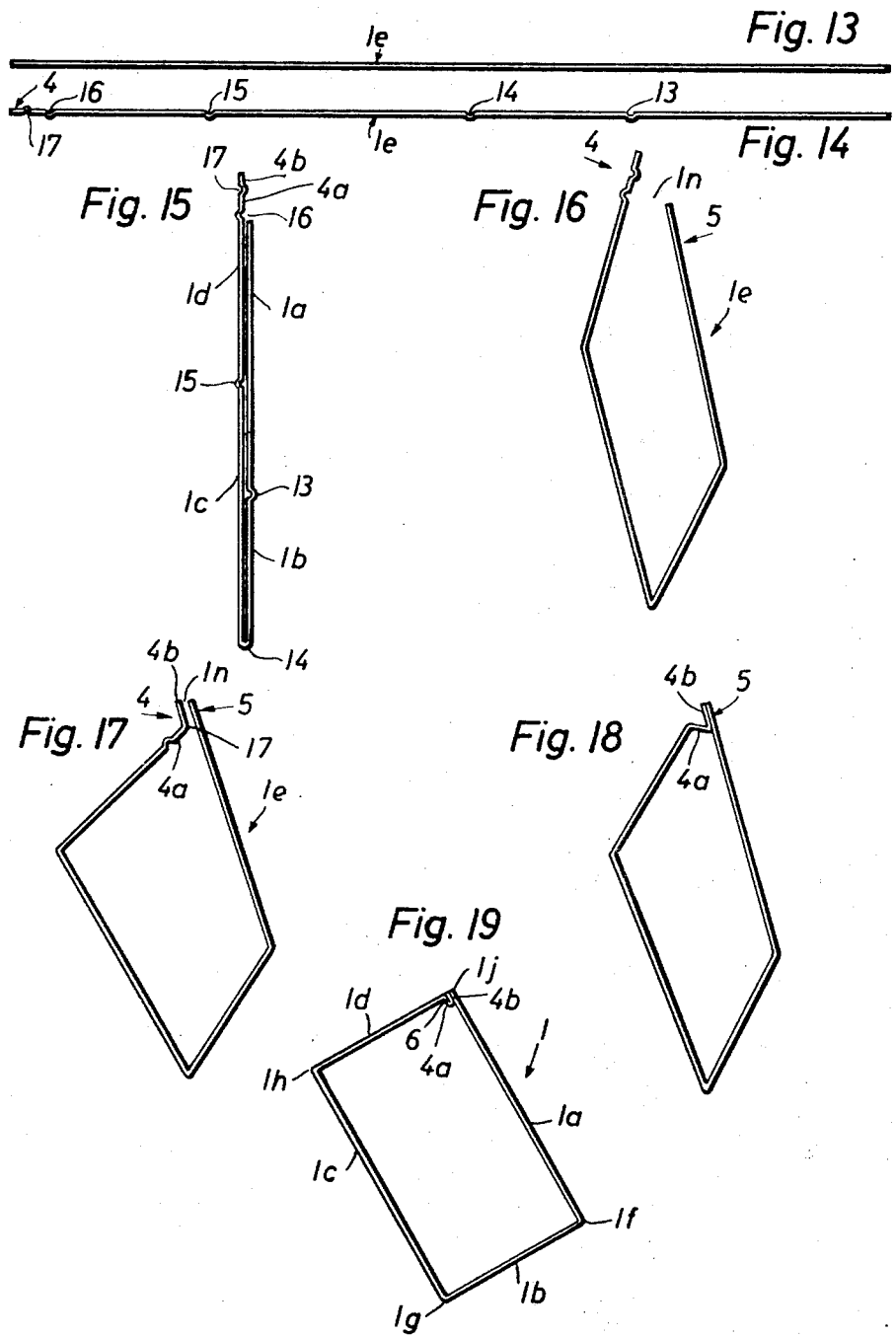

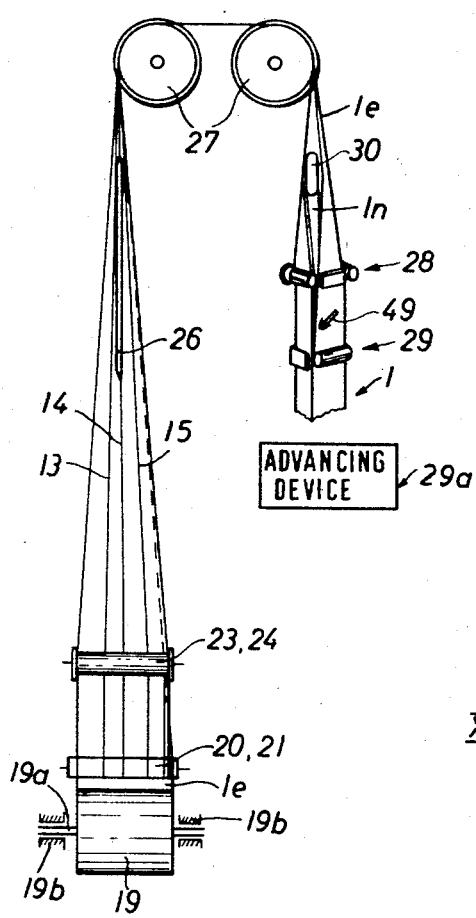
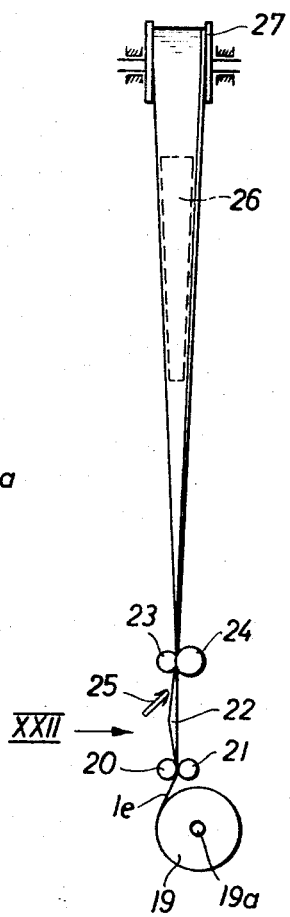

INVENTORS:
GEORG THESING
ECKEHARD SINGE

BY their ATTORNEY

Fig. 31
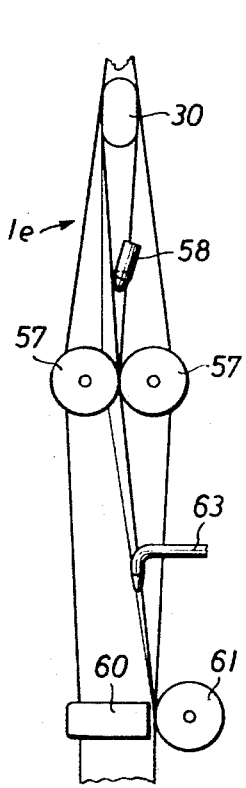
Fig. 27
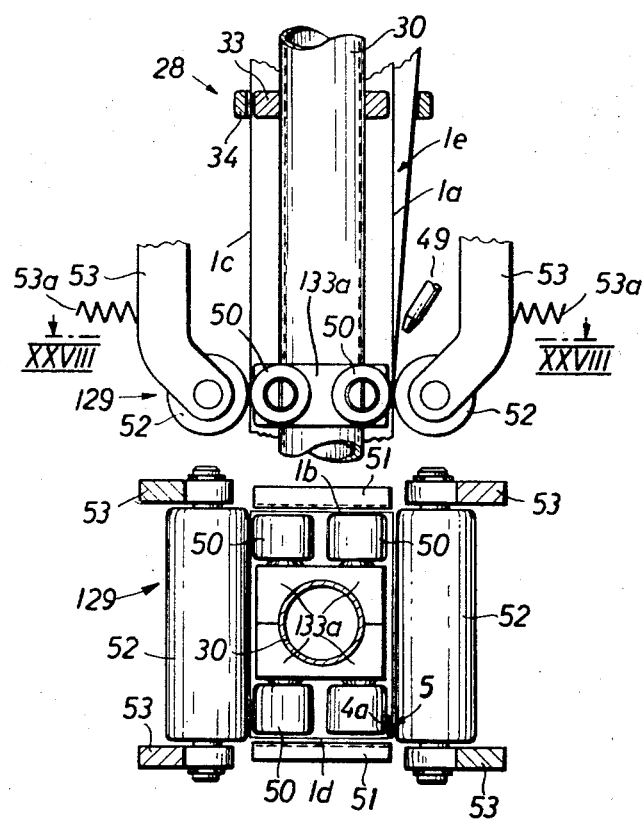
Fig. 28

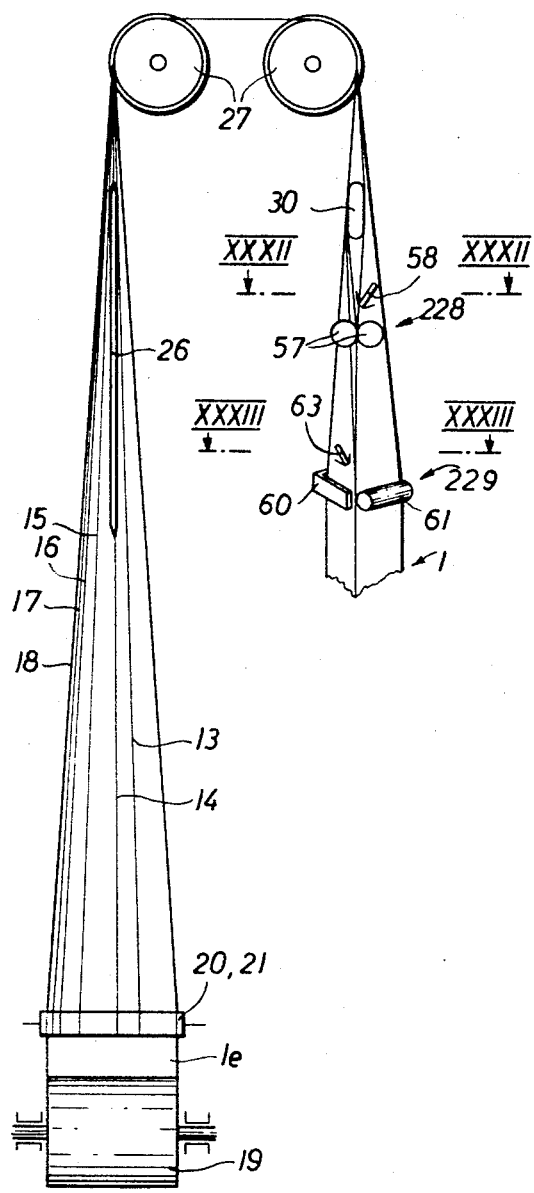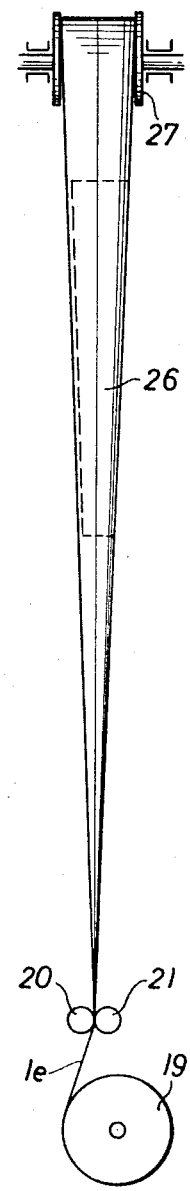

United States Patent Office 3,444,792
Patented May 20, 1969

3,444,792
METHOD FOR THE PRODUCTION OF TUBES
Georg Thesing, Dortmund-Schonau, and Eckehard Singe, Dortmund, Germany, assignors to Holstein & Kappert, Maschinenfabrik Phoenix GmbH., Dortmund, Germany
Filed Aug. 18, 1965, Ser. No. 480,597
Claims priority, application Germany, Aug. 20, 1964, H 53,589
Int. Cl. B31b 49/04, 1/00, 23/00
U.S. Cl. 93—35
8 Claims

ABSTRACT OF THE DISCLOSURE

A method of producing a tube of polygonal outline from an elongated web of the type having two longitudinally extending marginal portions consisting at least in part of weldable plastic material and comprising the steps of moving the web lengthwise and folding the web about a line extending between the marginal portions, internally expanding the thus folded web so that the expanded web resembles a polygon and said marginal portions remain temporarily spaced from each other to define a material admitting gap moving the marginal portions into close proximity of each other so that the planes of said marginal portions define between themselves an angle of less than 180°, and finally providing a fluid-tight welded joint between the aforementioned marginal portions to seal the gap, whereby the marginal portions define one corner of the tube.

---

The present invention relates to a method and apparatus for the production of tubes of the type which may be filled with flowable liquid or solid material prior to subdivision into separate sealed containers. More particularly, the invention relates to a method and apparatus for transforming an elongated web of plastic or plastic-coated material into a circumferentially complete tube prior to intermittent filling and subdivision of such tube into containers. Still more particularly, the invention relates to a method and apparatus for the production of tubes from a web whose longitudinally extending marginal portions or edges consist, at least in part, of heat-sealable plastic material so that such marginal portions may be directly or indirectly welded or otherwise sealingly connected to each other. The invention also relates to a tube which may be produced in accordance with our method and by the utilization of our apparatus.

It is already known to transform a flat web of thermoplastic or plastic-coated material into a tubular body of rectangular or other polygonal cross-sectional outline. As a rule, the marginal portions of the web are caused to overlap and are then welded or otherwise sealingly connected to each other. The thus obtained joint between the two marginal portions is provided in a zone which is located between two corners of the finished tube, or the joint forms a helix which extends at a slant across consecutive panels of the tube. A serious drawback of such tubes is that they cannot be readily provided with printed matter or with other indicia because the overlapping marginal portions impede proper application of print. In other words, the outer side of at least one panel on each of the containers which are obtained by subdivision of such tube must remain free of printed matter, or the printed matter which is applied to such one panel is illegible. Also, it is likely that the overlapping marginal portion of the joint will be caught on a sharp point or ridge with resultant partial opening or complete destruction of the container so that the flowable contents of the container will escape and will contaminate the containers which are immediately adjacent thereto.

Proper application of advertising matter, of instructions to use the contents of a container, of trademarks, of recipes and of similar printed material is of utmost importance to the manufacturer and/or distributor of containers so that it is highly desirable to provide as much space for print as is physically possible.

Accordingly, it is an important object of the present invention to provide a method for the production of tubes having a rectangular or other polygonal outline according to which a continuous length of tubing may be produced in a very simple apparatus, at a high speed, and in such a way that the joint between the marginal portions of the web cannot impede the application of printed matter to any of the outer sides on containers which are obtained on further processing of the tube.

Another object of the invention is to provide a method of the just outlined characteristics according to which an originally flat web may be transformed into a tube of rectangular or other polygonal outline by resorting to a novel apparatus which occupies little room, whose operation is fully automatic, which can process highly flexible as well as relatively stiff webs, and which comprises a relatively small number of simple component parts.

A further object of the invention is to provide a plastic or plastic-coated tube of rectangular or other polygonal outline wherein each panel has an entirely unobstructed outer surface, wherein the joint between the marginal portions of the web is fully concealed so as not to affect the appearance of containers, and wherein the joint is sufficiently strong to withstand considerable internal pressures.

An additional object of the invention is to provide a novel method of forming a fluid-tight joint between the marginal portions of a plastic or plastic-coated web.

Another object of the invention is to provide a method of transforming a continuous web into a tube of polygonal cross-sectional outline in a continuous operation, at a rate required for high-speed filling and separation of sealed containers, and in such a way that all sections of the tube have identical dimensions and that all such sections are formed with longitudinally extending joints of identical shape and strength (except at the joining corners, as illustrated in FIGS. 1–5).

Briefly stated, one feature of our invention resides in the provision of a method of producing a tube of polygonal cross section from an elongated web of the type having two longitudinally extending parallel marginal portions consisting at least in part of weldable plastic material. Basically, the method comprises the steps of moving the web lengthwise and folding it along a line or crease extending between the two marginal portions, internally expanding the thus folded web so that the expanded web resembles a polygon and the marginal portions remain temporarily spaced from each other to define a material-admitting gap, moving the marginal portions into close proximity of each other so that the planes of such marginal portions define beween themselves an angle of less than 180 degrees, and providing between the two marginal portions a fluid-tight welded joint to seal the gap whereby the marginal portions define one corner of the tube.

In accordance with a more specific feature of our invention, the method may be resorted to in the production of a tube having a preferably rectangular cross section. One preferred embodiment of the method comprises the steps of providing the traveling web with a plurality of longitudinally extending parallel creases which are disposed between the two marginal portions and one of which separates one of the marginal portions from the remainder of the web, simultaneously providing the one marginal portion with an additional crease which divides such marginal portion into an inner section adjacent to the one crease and an outer section, folding the web about another of the first mentioned creases, expanding the thus folded web so that each of the first mentioned creases extends along one corner of the resulting tube and leaving a material-admitting gap between the two marginal portions, folding the outer section over the inner section and moving the outer section into abutment with the inner side of the other marginal portion to close the gap, and welding the outer section to the inner section and to the inner side of the other marginal portion so that the resulting joint between the two marginal portions extends along one corner of the tube.

The welding of the outer section to the inner section may precede or it may follow the welding of the outer section to the other marginal portion, and the first welding step may precede the folding of the web.

In accordance with a modification of the just outlined method, the number of creases in the web may be less (by one) than the total number of corners on a finished tube. In carrying out this modified method, we utilize a preferably V-shaped or L-shaped insert which is placed between the marginal portions of the expanded web and is welded thereto so that it surrounds the inner side of the respective corner. In such tubes, the marginal portions of the web need not be creased and they need not be flexed or folded with reference to the adjoining portions of the web.

If the web comprises one or more paper layers or one or more layers consisting of a material which is likely to react with or to be otherwise affected by the flowable liquid or solid material which is introduced into the tube through the aforementioned gap, such layer or layers are coated with liners or weldable plastic material which does not react with the filler material. However, the end faces of the two marginal portions may remain uncoated because they inveriably extend outwardly and cannot come in actual contact with the contents of the tube.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawings, in which:

FIG. 1 is a diagrammatic cross-sectional view of a tube which is produced in accordance with a first embodiment of our invention and wherein one marginal portion of the web is folded over itself and is sealingly bonded or welded to the other marginal portion;

FIG. 2 is an enlarged sectional view of the structure surrounded by the broken-line circle II shown in FIG. 1;

FIG. 3 is a diagrammatic cross-sectional view of a modified tube wherein the joint between the marginal portions of the web includes an L-shaped or V-shaped insert;

FIG. 4 is an enlarged sectional view of the structure surrounded by the broken-line circle VI shown in FIG. 3;

FIG. 5 is a similar enlarged fragmentary section through a tube which is similar to that of FIG. 3 but whose joint includes a different insert;

FIG. 6 is an end view of a web which consists of flexible sheet material and which may be deformed into the shape of a tube of the type shown in FIGS. 1 and 2;

FIG. 7 illustrates the first step in the formation of the tube according to which the web of FIG. 6 is provided with five longitudinally extending fold lines or creases;

FIG. 8 illustrates the next step according to which one section of a marginal portion of the web is folded over and is welded to the other section;

FIG. 9 illustrates the step of folding the web of FIG. 8 over itself to form a flat body comprising two pairs of parallel panels;

FIG. 10 illustrates the next step according to which the web of FIG. 9 is partly expanded and begins to resemble a tube of rectangular cros-sectional outline wherein the marginal portions of the web define a material-admitting gap;

FIG. 11 illustrates the next step according to which the sealingly connected sections of one marginal portion of the web are brought into substantial parallelism with the other marginal portion;

FIG. 12 illustrates the finished tube with the two marginal portions of the web welded to each other to seal the material-admitting gap;

FIGS. 13 to 19 illustrate the steps of a modified method of transforming a flat web into a tube of the type shown in FIGS. 1, 2 and 12;

FIG. 20 is a schematic side elevational view of a first apparatus which may be utilized for practicing the method of FIGS. 6 to 12;

FIG. 21 is a schematic end elevational view of the apparatus as seen from the left-hand side of FIG. 20;

FIG. 22 is an enlarged fragmentary detail view of the apparatus, substantially as seen in the direction of the arrow XXII in FIG. 21, and illustrates a first folding member which is used to fold one section of a marginal portion of the web over the other section in a manner as illustrated in FIG. 8;

FIG. 23 is a fragmentary front elevational view of the structure shown in FIG. 22;

FIG. 27 is a partly side elevational and partly vertical sectional view of a modified welding station which may be utilized in the apparatus of FIGS. 20 and 21;

FIG. 28 is a horizontal section substantially as seen in the direction of arrows from the line XXVIII—XXVIII of FIG 27;

FIG. 29 is a schematic side elevational view of an apparatus which may be utilized for practicing the method of FIGS. 13–19;

FIG. 30 is a schematic end elevational view as seen from the left-hand side of FIG. 29;

FIG. 31 is an enlarged fragmentary side elevational view of a detail of the apparatus shown in FIG. 29;

Figure 24:
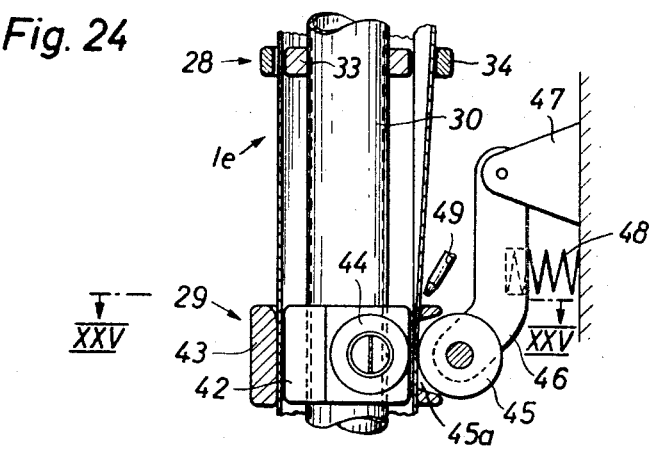
FIG. 24 is a larger-scale vertical sectional view through a folding and calibrating station and through a welding station, both forming part of the apparatus shown in FIGS. 20 and 21.

Referring first to FIG. 1, there is shown, in transverse section, an enlongated tube 1 consisting at least in part of heat-sealable or weldable plastic material and having a rectangular cross-sectional outline. This tube comprises four smooth-surfaced panels 1a, 1b, 1c, 1d and includes a single web 1e of flexible material. The web is of constant width and is shaped in a manner which will be disclosed in full detail in connection with FIGS. 6–12 and 20–28 or 13–19 and 29–33. The tube 1 is provided with four sharply defined corner zones 1f, 1g, 1h, 1j, and the corner zone 1j is formed in a manner as shown in FIG. 2. The web 1e comprises a central layer 2 of paper or the like and two heat-sealable thermoplastic liners 3 which coat the inner and outer sides of the layer 2 but not the end faces 8 and 9.

In transforming the originally flat web 1e (see FIG. 6) into the tube 1, the apparatus which will be described in connection with FIGS. 20–28 or 29–33 provides the web with four longituidnally extending parallel fold lines or creases 13, 14, 15, 16 (see FIG. 7) which extend along the corners 1f, 1g, 1h, 1j, and with an additional crease 17 which halves a marginal portion 4 of the web so that the marginal portion 4 is subdivided into two sections 4a and 4b. In the next step, the section 4b is folded through 180 degrees over and then overlaps the section 4a (see FIG. 8) so that it constitutes an outer section and that the section 4a constitutes an inner section. In a further step, the outer section 4b is moved into abutment with the inner side of the other marginal portion 5 of the web 1e so that the marginal portion 5 overlaps the outer section 4b, and the apparatus then forms a joint which sealingly connects the outer section 4b to the inner section 4a and to the marginal portion 5. If desired, the sections 4a and 4b may be bonded to each other in a preceding step. In FIG. 2, the joint consists of two seams 6 and 7 the former of which is obtained by heat-sealing the liner 3 at the outer side of the inner section 4a to the liner 3 at the inner side of the outer section 4b. The seam 7 is obtained by heat-sealing the liner 3 at the outer side of the outer section 4b to the liner 3 at the inner side of the marginal portion 5. In this way, the uncoated end faces 8 and 9 of the central layer 2 are sealed from the interior of the tube 1 so that the material which ultimately fills the tube cannot penetrate into the material of the central layer. In other words, that liner 3 which coats the inner side of the deformed web 1e fully coats the interior of the tube 1.

The tube is then filled with flowable liquid or solid material and is formed with transverse seals to transform it into a series of fully sealed containers. The manner in which the tube is transformed into containers forms no part of our present invention.

FIGS. 3 and 4 illustrate a modified tube 1' which is used in the manufacture of exceptionally strong containers. In this tube, the marginal portions 4' and 5' meet along the corner zone 1j', and the marginal portion 4' need not be folded over itself. The joint comprises a V-shaped or L-shaped insert or strip 1k' which extends along and is sealingly bonded to the inner sides of the marginal portions 4', 5'. The insert 1k' comprises a central layer 10 of a material which cannot react with and cannot contaminate the material that ultimately fills the containers so that the longitudinally extending end faces 10a of the insert can remain exposed and come in contact with such material. For example, the central layer 10 may consist of aluminum foil and at least its outer side is coated with a liner 11 of heat-sealable material. As best shown in FIG. 4, the liners 11 do not coat the end faces 10a. The web 1e' of which the tube 1' is made comprises a central layer 2' of paper and liners 3' which coat both sides of the web but leave the end faces 8', 9' of the marginal portions 4', 5' exposed.

The joint between the marginal portions 4', 5' further comprises two welded seams 6', 7' which are provided between the outer liner 11 of the insert 1k' and the inner liners 3' of the marginal portions 4', 5'. The seams 6', 7' provide a fluid-tight seal between the interior of the tube 1' and the non-coated end faces 8', 9' of the marginal portions 4', 5'.

The insert 1k' may be obtained by subdividing a large sheet of coated aluminum foil into elongated strips and by thereupon deforming each strip into a substantially V-shaped or L-shaped body. The fact that the end faces 10a of the strip 1k' need not be coated contributes considerably to lower cost of the tube 1'.

FIG. 5 illustrates the corner zone 1j" of a third tube 1" whose web 1e' is identical with the web 1e' of FIG. 4. The insert 1k' is replaced by an insert 1k" which comprises a central layer 12 of paper and heat-sealable liners 11" which fully surround the layer 12, i.e., the liners 11" also coat the end faces of the layer 12 so that the latter cannot come in contact with the flowable material which is introduced into the tube 1" prior to the formation of transverse seals and prior to subdivision of the tube 1" into separate prismatic containers. The liner 11" at the outer side of the L-shaped or V-shaped insert 1k" is welded to the inner liners 3' of the marginal portions 4' 5' to form therewith a pair of elongated seams 6", 7".

FIGS. 6-12 illustrate the steps of a first method of forming the tube 1 of FIGS. 1 and 2. In the first step, the originally flat web 1e (FIG. 6) is provided with five parallel fold lines or creases 13, 14, 15, 16, 17 (FIG. 7) which extend in the longitudinal direction of the web. In conventional methods, the web is only provided with four creases each of which is located at one corner of the tube and the marginal portions of the web are bonded to each other in a zone which is located midway between two corners.

The creases 13-16 are impressed into one side of the web 1e but the crease 17 is impressed into the other side, see FIG. 7. This additional crease 17 halves the marginal portion 4 to facilitate the formation of sections 4a, 4b best shown in FIG. 2. The section 4b is then folded through 180 degrees over the section 4a in a manner as shown in FIG. 8 and is welded thereto to form the seam 6. In other words, the section 4b is turned about the crease 17 through an angle of 180 degrees so that one of its sides overlies and abuts against the adjacent side of the section 4a.

In a next-following step, the panels 1c, 1d of the web 1e are turned about the crease 14 in a manner shown in FIG. 9 so that the marginal portion 4 extends beyond the marginal portion 5 whereby the web 1e is doubled and forms a flat twin-walled body which is then partially expanded as shown in FIG. 10 to form a partially open polygonal tube and to provide a longitudinally extending temporary gap 1n through which the flowable material enters to fill the leading end of the tube. In a further step which is shown in FIG. 11, the marginal portion 4 is flexed about the crease 16 so that the exposed side of the outer section 4b faces the inner side of the marginal portion 5 and the web 1e is expanded still further to closely resemble a tube of substantially rectangular cross-sectional outline. In the final step, shown in FIG. 12, the section 4b of the marginal portion 4 is moved into abutment with and is welded to the marginal portion 5 to form the seam 7 and to complete the transformation of the web 1e into a tube 1 of truly rectangular cross-sectional outline with two wider panels 1a, 1c and two narrower panels 1b, 1d.

FIGS. 13-19 illustrate the steps of a modified method which can be utilized in transforming a flat web 1e (FIG. 13) into a tube 1 (FIG. 19) of rectangular cross-sectional outline. As shown in FIG. 14, the web 1e is again provided with five parallel fold lines or creases 13-17. However, in the next-following step which is shown in FIG. 15, the web 1e is folded over itself along the crease 14 prior to folding of the section 4b over the section 4a so that the sections 4a, 4b remain coplanar with the panels 1c, 1d. FIG. 16 illustrates that step according to which the web 1e is partly expanded to provide a gap 1n which allows for admission of flowable material into the leading end of the tube. The section 4b is thereupon bent outwardly about the additional crease 17, see FIG. 17, and the outer side of the section 4b is moved directly opposite the inner side of the marginal portion 5 to reduce the width of the gap 1n. In the step which is shown in FIG. 18, the section 4b is moved into abutment with and is welded to the inner side of the marginal portion 5 to form the seam 7, and the section 4a is simultaneously turned about the crease 16 so that its plane is inclined with reference to the plane of the panel 1d. In the final step which is shown in FIG. 19, the section 4a is moved into abutment with and is welded to the section 4b to form the seam 6. Thus, the method shown in FIGS. 13-19 differentiates from the method of FIGS. 6-12 in that the sequence of forming the seams 6, 7 is reversed and in that the formation of a circumferentially complete tube 1 is finished before the sections 4a, 4b are actually welded to each other.

An apparatus which may be utilized for practicing the method of FIGS. 6–12 (i.e., for the production of a tube 1 of the type shown in FIGS. 1 and 2) is illustrated in FIGS. 20 and 21. The web 1e is withdrawn from a source of supply including a reel 19 whose shaft 19a is journalled in bearings 19b. The web 1e is advanced in an elongated path and first travels upwardly as viewed in FIGS. 20 and 21, and, while moving upwardly, is caused to pass between a pair of cooperating creasing rollers 20, 21 which provide the web with the five fold lines or creases 13–17. The web 1e thereupon passes along a first folding member 22, best shown in FIGS. 22 and 23, which folds the section 4b in a first direction and over the section 4a (FIG. 8), and the thus deformed web is caused to advance through a first heat-sealing or welding station including a nozzle 25 and two compressing or welding rollers 23, 24. The nozzle 25 discharges one or more jets of hot air or another fluid which softens the thermoplastic material of the liners 3 on the sections 4a, 4b so that such liners adhere to each other and form the seam 6 when the sections 4a, 4b travel between the rollers 23 and 24. The orifice of the nozzle 25 is preferably located directly upstream of the rollers 23, 24 to make sure that the material of the liners 3 on the sections 4a, 4b is in optimum condition for welding.

The apparatus further comprises a wedge-shaped or sword-shaped second folding member 26 which extends into the crease 14 (see also FIG. 9) and folds the panels 1a, 1b in a second direction and over the panels 1c, 1d before the web 1e passes over a pair of deflecting or reversing rollers 27 which change its direction of movement so that the web travels in a downwardly extending portion of its path and toward a filling station accommodating a stationary material admitting or filling mandrel 30. The mandrel 30 extends through the gap in (see FIG. 10) and admits a stream of liquid or comminuted solid material, such material being fed from a suitable source (not shown) and being caused to flow downwardly and into that portion of the web 1e which already forms a circumferentially complete tube 1.

That portion of the mandrel 30 which extends through the gap in 1n is located upstream of a combined folding and expanding or calibrating station 28 at which the marginal portion 4 is bent inwardly, as shown in FIG. 11, and at which the web 1e is partly expanded to resemble a tube of nearly rectangular cross-sectional outline. The station 28 is followed by a second sealing or welding station 29 at which the outer section 4b is welded to the marginal portion 5 (see FIG. 12) to complete the formation of the tube 1. The station 29 accommodates a nozzle 49 which directs a stream of hot air against the liners 3 on the marginal portions 4 and 5 to facilitate the formation of the seam 7.

That portion of the mandrel 30 which extends into the interior of the web 1e is flattened (see FIG. 20) so that the gap 1n may have a relatively small width.

Figure 25:
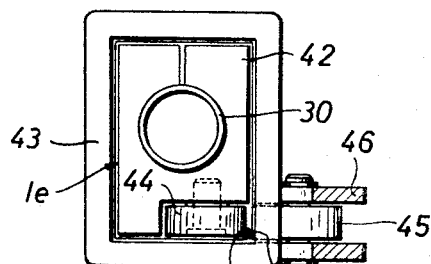
FIG. 25 is a horizontal section substantially as seen in the direction of arrows from the line XXV—XXV of FIG. 24.

FIGS. 24 and 25 illustrate the stations 28 and 29 of FIGS. 20 and 21. The combined expanding or calibrating and folding station 28 accommodates a substantially rectangular expanding or calibrating member 33 which is accommodated in the interior of the web 1e and is carried by the mandrel 30, and a substantially rectangular folding member 34 which surrounds the web 1e and the calibrating member 33. The folding member 34 is secured to a stationary part of the apparatus frame, not shown. It is preferred to coat the web-engaging surfaces of the members 33 and 34 with films of non-adherent material, for example, with a plastic known as Teflon (trademark). It is also possible to produce the entire member 33 and/or 34 of such non-adherent material.

The welding or sealing station 29 accommodates the aforementioned nozzle 49 and a rectangular inner guide member or carrier 42 which is mounted on the mandrel 30 and is located directly downstream of the orifice of the nozzle 49, see FIGS. 24 and 25. The welding device further includes an outer guide member or holder 43 which surrounds the carrier 42 with a clearance sufficing to allow for passage of the web 1e. The carrier 42 supports a compressing or welding roller 44 which rolls along the inner section 4a, and the holder 43 is formed with a cutout 45a for a second compressing or welding roller 45 which rolls along the outer side of the marginal portion 5. The roller 45 is mounted on a lever or arm 46 which is mounted in fixed bearing brackets 47 and is biased by a helical expansion spring 48 so that the periphery of the roller 45 bears against the marginal portion 5 and presses it against the section 4b whereby the liners 3, which were softened by hot fluid issuing from the nozzle 49, are welded to each other and form the seam 7.

The outer welding roller 45 may be driven so that it then constitutes one component of the means for advancing the web 1e in the elongated path extending from the reel 19, around the reversing rollers 27 and downwardly along the stations 28 and 29. Alternatively, the device for advancing the web 1e may comprise a separate set of driven and idler rollers which are located downstream of the welding station 29. This device is indicated in FIG. 20 by a reference numeral 29a.

Figure 26:
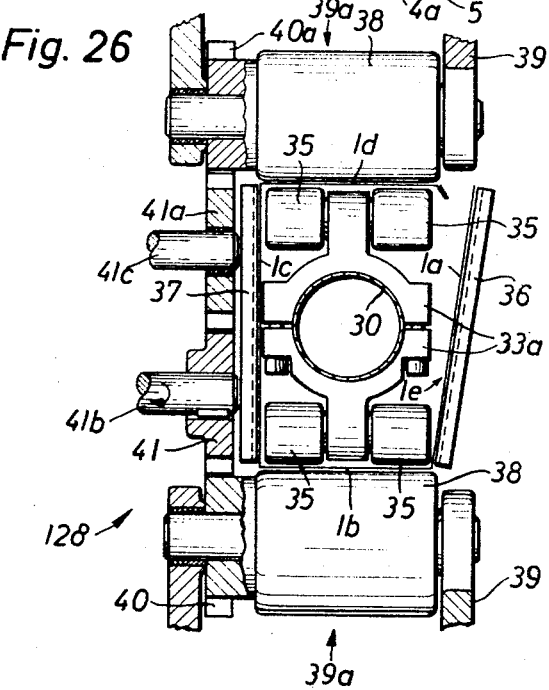
FIG. 26 is a horizontal section through a modified folding and calibrating station which may be utilized in the apparatus of FIGS. 20 and 21.

FIG. 26 illustrates a combined folding and expanding or calibrating station 128 which may replace the station 28 and which may be utilized with particular advantage for shaping of relatively rigid web material. The calibrating member 33 of FIG. 24 is replaced by a two-piece carrier 33a whose halves are clamped onto the mandrel 30 in the interior of the web 1e and which mounts two pairs of expanding or calibrating rollers 35.

The folding member 34 of FIG. 24 is replaced by a composite folding assembly including two rigid plate-like folding members 36, 37 which fold the wider panels 1a, 1c of the web 1e, and by two folding rollers 38 which fold the narrower panels 1b, 1d. The rollers 38 are mounted in spring-biased holders 39 which urge these rollers to move in directions indicated by arrows 39a. The rollers 38 also serve as a part of the means for advancing the web 1e lengthwise because they are driven by a shaft 41b carrying a spur gear 41 which meshes with a spur gear 41a on a second shaft 41c. The gears 41, 41a respectively mesh with gears 40, 40a each of which is coaxially secured to one of the folding rollers 38.

FIGS. 27 and 28 illustrate a modified welding station 129 which may be utilized in connection with relatively stiff webs. The parts accommodated at the welding station 129 are similar to the parts shown in FIG. 26 with the exception that the outer rollers 52 are outwardly adjacent to the relatively wide panels 1a and 1c of the web 1e whereas the rollers 38 of FIG. 26 engage the narrower panels 1b and 1d. The mandrel 30 supports a two-piece carrier 133a for pairs of calibrating rollers 50 one of which rolls along the inner section 4a. The adjoining outer roller 52 replaces the welding roller 45 of FIGS. 24 and 25 and bears against the outer side of the marginal portion 5 to form the seam 7. The orifice of the nozzle 49 is located directly upstream of the carrier 133a.

The outer rollers 52 are mounted in holders 53 which are biased by springs 53a. The narrower panels 1b, 1d of the web 1e are flexed by rigid folding members 51. The springs 53a apply the necessary welding or sealing pressure for the formation of the seam 7 without, however, subjecting the material of the web 1e to excessive deforming or compressive stresses. The holders 53 are rockably supported by a stationary frame member, not shown, and the apparatus preferably comprises suitable means for adjusting the bias of the spring 53a.

The apparatus shown in FIGS. 20–25, and its modifications shown in FIG. 26 and in FIGS. 27–28, may be accommodated in a very small area because the stations 28, 29 or 28, 129 or 128, 29 or 128, 129 may be provided directly below the right-hand reversing roller 27 of FIG. 20. Therefore, the space below the second welding station 29 or 129 may accommodate conventional sealing and cutting or severing devices which provide the tube 1 with transverse seams so as to transform the leading end of the tube into a fully sealed container and to thereupon cut the tube across such transverse seams to separate the containers from the web 1e. The space below the welding station 29 or 129 may also accommodate a conventional stacking or crating device which automatically introduces the containers into cardboard boxes or similar receptacles for transportation to storage or to a customer. The containers may be filled with milk, fruit juices, other liquids, powders, tea, granulae or other types of flowable materials. As is well known in the art of such apparatus, the mandrel 30 discharges accurately measured quantities of flowable material so that each container will have the same weight or will contain the same volume of liquid or solid material.

The distance between the reel 19 and the reversing rollers 27 must suffice to allow for creasing the web 1e, for folding of the section 4b in one direction along the crease 17, and for folding of the web in another direction along the crease 14.

The apparatus shown in FIGS. 29 and 30 is utilized for carrying out the method of FIGS. 13–19. The folding member 22 of FIGS. 20–23 is omitted so that the web 1e is folded by the member 26 (see FIG. 15) while the section 4b remains substantially coplanar with the section 4a and with the panels 1c, 1d. The construction of the creasing rollers 20, 21 is the same as in the apparatus of FIGS. 20 and 21.

Figure 32:
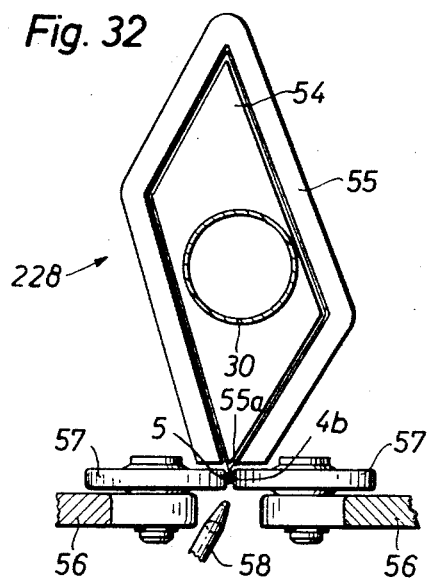
FIG. 32 is an enlarged horizontal section substantially as seen in the direction of arrows from the line XXXII—XXXII of FIG. 29.

After passing over the reversing rollers 27, the web 1e advances through a combined folding, expanding or calibrating and welding station 228 which is shown in FIGS. 31 and 32. This station 228 accommodates an expanding or calibrating member 54 which is mounted on the mandrel 30 and serves to expand the web 1e in a manner as shown in FIGS. 16 and 17. The calibrating member 54 is surrounded by a folding member 55 which causes the web 1e to assume the shape shown in FIG. 17 so that the marginal portion 5 and the section 4b extend beyond a slot 55a defined by the member 55, see FIG. 32. The welding device comprises two welding rollers 57 which engage the outer sides of the marginal portion 5 and section 4b to form the seam 7. The rollers 57 are mounted on spring-biased arms or holders 56, and the welding device further comprises a nozzle 58 which blows hot air against the liners 3 on the marginal portions 4 and 5 to soften the heat-sealable material prior to entry into the space between the welding rollers 57. The nozzle 58 is located immediately upstream of the rollers 57.

Figure 33:
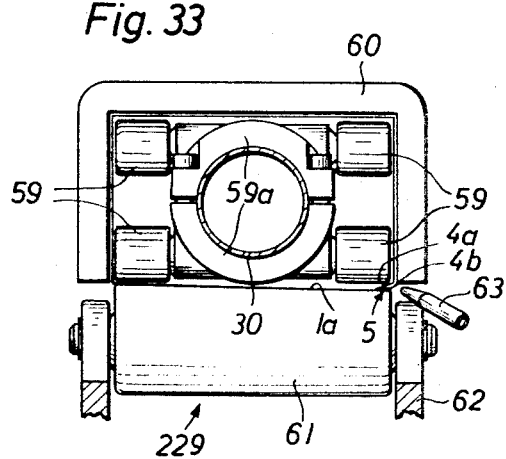
FIG. 33 is an enlarged horizontal section substantially as seen in the direction of arrows from the line XXXIII—XXXIII of FIG. 29.

The second welding station 229 is shown in FIG. 33. This station accommodates a carrier 59a which is clamped onto the mandrel 30 and supports two pairs of expanding or calibrating rollers 59 one of which acts as a welding roller in that it bears against the inner side of the section 4a and presses it against the section 4b. The rollers 59 are surrounded by a U-shaped folding member 60 which leaves the panel 1a exposed so that this panel may be engaged by an outer welding roller 61 which bears against the marginal portion 5 and presses it against the section 4b. The liners 3 on the sections 4a, 4b are softened by hot air issuing from a nozzle 63 which is located immediately upstream of the roller 61. The roller 61 cooperates with the adjoining roller 59 to form the seam 6 and is mounted in a spring-biased holder 62. The rollers 59 and 61 cooperate to fold the section 4a in a manner shown in FIG. 18 and to move it into abutment with the section 4b, see FIG. 19.

It is clear that the improved apparatus is susceptible of many additional modifications without departing from the spirit of the present invention. For example, plate-like or rail-like folding and expanding or calibrating members may be replaced by rollers and rolls, or vice versa. Referring to FIG. 33, the U-shaped folding member 60 may be replaced by a set of rollers and at least the rollers 59 may be replaced by a U-shaped or rectangular expanding or calibrating member.

The tube 1' or 1" of FIGS. 3–4 and 5 may be formed in apparatus which are similar to the apparatus of FIGS. 20–33. The insert 1k' or 1k" is sealingly secured first to one of the marginal portions 4' or 5' and then to the other marginal portion. The rollers 20, 21 are replaced by rollers which provide the web 1e' with three parallel creases 13–15. In many respects, the apparatus for the formation of tubes 1' and 1" is even simpler than the apparatus for practicing the method of FIGS. 6–12 and 13–19 because the means for folding the sections 4a, 4b may be dispensed with.

A very important advantage of our improved method and apparatus is that the joint between the marginal portions of the web 1e or 1e' is fully concealed from view so that the outer side of each panel may be provided with printed matter. This is due to the fact that the joint extends along one of the corners of the tube 1, 1' or 1" and that the overlapping sections 4a, 4b or the legs of the insert 1k' or 1k" are located in the interior of the tube.

Since the end faces 8, 9 or 8', 9' of the web 1e or 1e' cannot come in contact with the contents of the containers, such end faces need not be coated or impregnated even if the central layer or layers of the web consist of a material which is likely to react with or to be otherwise adversely affected by the contents of the containers. In many heretofore known tubes and containers, the end faces of the marginal portions of the web must be coated or impregnated with a material which cannot react with the filler material, and this involves additional work as well as considerable expenditures in money, material and machinery. Such coating and impregnating of at least one end face is necessary when the joint is located between two corners of the tube and when the joint is formed by placing one marginal portion over the other marginal portion prior to the actual welding or bonding step. It is also known to bend the marginal portions outwardly, substantially as shown in FIG. 18 for the marginal portion 5 and outer section 4b, and to thereupon weld the two marginal portions to each other so that the joint consists of an outwardly extending flap. Such joints affect the appearance of containers and are less resistant to internal expanding stresses so that the container is likely to burst open in response to squeezing.

In our improved tube, the joint consists of overlying portions or sections which are mainly subjected to shearing stresses so that the joint is very strong and may resist considerable internal pressures.

Without further analysis, the foregoing will so fully reveal the gist of the present invention that others can, by applying current knowledge, readily adapt it for various applications without omitting features which fairly constitute essential characteristics of the genueric and specific aspects of our contribution to the art and, therefore, such adaptations should and are intended to be comprehended within the meaning and range of equivalence of the following claims.

What is claimed as new and desired to be protected by Letters Patent is:

1. A method of producing a tube of rectangular outline from an elongated web of the type having along opposite parallel edges two longitudinally extending marginal portions consisting at least in part of weldable plastic material, comprising the steps of moving the web lengthwise and providing the moving web with four longitudinally extending creases one of which separates one of said marginal portions from the remainder of the web and simultaneously providing said one marginal portion with an additional crease which divides said one marginal portion into an inner section adjacent to said one crease and an outer section; folding said web in a first direction about another of said first mentioned creases; gradually expanding the thus folded web from the inside so that each of said first mentioned creases extends along one corner of the resulting tube and temporarily leaving a material-admitting gap between said marginal portions; folding said outer section in a second direction through 180° over said inner section so that the inner face of said outer section abuts against the outer face of said inner section and moving the outer face of said outer section into abutment with the inner face of the other marginal portions; and welding said outer section to said inner section and to said other marginal portion at said abutting faces to each other so that the resulting joint between said marginal portions extends along one corner of the tube with said other marginal portion located substantially in one plane with the corresponding web portion.

2. A method as set forth in claim 1, wherein said outer section is welded to said other marginal portion prior to welding to said inner section.

3. A method as set forth in claim 1, wherein the welding of said outer section to said inner section precedes the welding of said outer section to said other marginal portion.

4. A method as set forth in claim 3, wherein the welding of said outer section to said inner section precedes the folding of said web.

5. A method as set forth in claim 1, wherein said first mentioned creases are impressed into one side and said additional crease is impressed into the other side of said web.

6. A method as set forth in claim 1, wherein said moving step comprises advancing the web upwardly during creasing and advancing the web downwardly on completion of folding in said first direction.

7. A method as set forth in claim 1, wherein said welding step comprises heating said weldable material and thereupon pressing the thus heated sections against each other and against said other marginal portion.

8. A method as set forth in claim 7, wherein the weldable material is heated by a hot gas and wherein such heating immediately precedes pressing of said sections against each other and against said other marginal portion.

References Cited

UNITED STATES PATENTS

| | | | |
|---|---|---|---|
| 326,094 | 9/1885 | Bennett | 93—94 |
| 726,894 | 5/1903 | Ferres | 138—144 |
| 1,985,997 | 1/1935 | Keeran | 93—94 X |
| 2,035,304 | 3/1936 | Dieffenbach | 138—144 |
| 2,778,557 | 1/1957 | Moore | 93—49 X |
| 2,906,180 | 9/1959 | Bracht | 93—94 |
| 2,934,466 | 4/1960 | Molla | 93—94 X |
| 3,150,573 | 9/1964 | Piazze | 93—35 |
| 3,153,991 | 10/1964 | Goodrich | 93—48 |
| 3,155,018 | 11/1964 | Kirsten et al. | 93—82 |
| 3,313,216 | 4/1967 | Piazze | 93—8 |
| 2,401,109 | 5/1946 | Rohdin. | |
| 3,335,540 | 8/1967 | Reil | 53—28 |
| Re. 26,062 | 7/1966 | Ahlbrandt | 93—20 |
| 2,799,211 | 7/1957 | Zerlin. | |
| 2,857,826 | 12/1954 | Brady. | |
| 3,006,257 | 10/1961 | Orsini. | |
| 3,280,704 | 10/1966 | Ahlbrandt | 93—20 |

FOREIGN PATENTS

| | | |
|---|---|---|
| 145,220 | 2/1952 | Australia. |
| 934,592 | 8/1963 | Great Britain. |

WAYNE A. MORSE, JR., *Primary Examiner.*

U.S. Cl. X.R.

93—1, 8, 12, 20, 36.01, 82, 94